US010448385B2

(12) United States Patent
Huang et al.

(10) Patent No.: US 10,448,385 B2
(45) Date of Patent: Oct. 15, 2019

(54) CONFIGURATION AND TRANSMISSION OF A UPLINK SHORT BURST

(71) Applicant: QUALCOMM Incorporated, San Diego, CA (US)

(72) Inventors: Yi Huang, San Diego, CA (US); Wei Zeng, San Diego, CA (US); Hao Xu, Beijing (CN); Renqiu Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1 day.

(21) Appl. No.: 15/797,729

(22) Filed: Oct. 30, 2017

(65) Prior Publication Data
US 2018/0124755 A1 May 3, 2018

Related U.S. Application Data

(60) Provisional application No. 62/415,336, filed on Oct. 31, 2016.

(51) Int. Cl.
H04W 72/04 (2009.01)
H04L 5/00 (2006.01)
H04L 5/14 (2006.01)

(52) U.S. Cl.
CPC ......... *H04W 72/042* (2013.01); *H04L 5/0028* (2013.01); *H04L 5/0042* (2013.01);
(Continued)

(58) Field of Classification Search
CPC ............ H04W 72/042; H04W 72/0413; H04L 5/0042; H04L 5/0048; H04L 5/1469;
(Continued)

(56) References Cited

U.S. PATENT DOCUMENTS

2010/0303034 A1* 12/2010 Chen ..................... H04L 5/0023
370/329
2018/0316464 A1* 11/2018 Stern-Berkowitz .........................
H04L 1/0034

OTHER PUBLICATIONS

Neul: 3GPP Draft; Gp-140435, "Outline Proposal for Clean-Slate Physical Layer for IOT", 3rd Generation Partnership Project (3GPP), Mobile Competence Centre; 650, Route Des Lucioles, F-06921 Sophia-Antipolis Cedex, vol. TSG GERAN Aug. 24, 2014 (Aug. 24, 2014), XP050779793, 9 Pages, Retrieved from the Internet: URL:http:jjwww.3gpp.orgjftp/Meetings_3GPP_SYNC/GERAN/ Docs/ [retrieved on Aug. 24, 2014].

(Continued)

*Primary Examiner* — Chuong A Ngo
(74) *Attorney, Agent, or Firm* — Arent Fox LLP

(57) ABSTRACT

Various aspects include a method and an apparatus for receiving a uplink (UL) short burst at an eNB, by determining, at the eNB, one or more tone assignments for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH), transmitting the one or more tone assignments to the UE, and receiving the UL short burst from the UE, wherein the UL short burst is generated at the UE based at least on the one or more tone assignments transmitted from the eNB. Methods may include transmitting a uplink (UL) short burst from a user equipment (UE).

20 Claims, 7 Drawing Sheets

(52) U.S. Cl.
CPC .......... *H04L 5/0048* (2013.01); *H04L 5/0066* (2013.01); *H04L 5/0094* (2013.01); *H04L 5/1469* (2013.01); *H04W 72/0413* (2013.01); *H04L 5/0012* (2013.01); *H04L 5/0044* (2013.01)

(58) Field of Classification Search
CPC ... H04L 5/0094; H04L 5/0028; H04L 5/0066; H04L 5/0012; H04L 5/0044
See application file for complete search history.

(56) References Cited

OTHER PUBLICATIONS

Ericsson: "DCI for Short TTI Uplink Transmissions", 3GPP Draft; [LATRED] R1-160938 UL DCI, 3rd Generation Partnership Project—(3GPP), Mobile Competence Centre; 650, Route Des Lucioles; F-06921 Sophia-Antipolis Cedex; France, vol. RAN WG1, no. Malta; (Feb. 15, 2016-Feb. 19, 2016) Feb. 6, 2016 (Feb. 6, 2016), XP051064067, 7 Pages, Retrieved from the Internet: URL:http://www.3gpp.org/ftp/tsg_ran/WG1_RL1/TSGR1_84/Docs [retrieved on Feb. 6, 2016].

Ericsson: "DL Control for Short TTI", 3GPP Draft; R1-1610324. 3rd Generation Partnership Project (3GPP), Mobile Competence Centre ; 650. Route Des Lucioles; F-06921 Sophia-Antipolis Cedex, France, vol. RAN WG1. no. Lisbon. Portugal, (Oct. 10, 2016-Oct. 14, 2016) Oct. 9, 2016 (Oct. 9, 2016), XP051150339, 8 Pages, Retrieved from the Internet: URL:http://www.3gpp.org/ftp/Meetings_3GPP_SYNC/RAN1/Docs/ [retrieved on Oct. 9, 2016].

Huawei et al: "Discussion on Control Channel Design", 3GPP Draft; R1-167203, 3rd Generation Partnership Project (3GPP), Mobile Competence Centre; 650, Route Des Lucioles ; F-06921 Sophia-Antipolis Cedex; France, vol. Ran WG1, no. Gothenburg, Sweden; (Aug. 22, 2016-Aug. 26, 2016) Aug. 21, 2016 (Aug. 21, 2016), XP051125772, 5 Pages, Retrieved from the Internet: URL:http://www.3gpp.org/ftp/Meetings_3GPP_SYNC/RAN1/Docs/ [retrieved on Aug. 21, 2016].

Partial International Search Report—PCT/US2017/059285—ISA/EPO—dated Feb. 15, 2018.

International Search Report and Written Opinion—PCT/US2017/059285—ISA/EPO—dated Apr. 16, 2018.

* cited by examiner

CONFIGURATION AND TRANSMISSION OF A UPLINK SHORT BURST

REFERENCE TO RELATED APPLICATIONS

This application claims the benefit of priority to U.S. Provisional Application No. 62/415,336, entitled "Configuration and Transmission of an Uplink Short Burst" filed on Oct. 31, 2016, which is incorporated herein by reference in its entirety.

BACKGROUND

The present disclosure relates generally to communication systems, and more particularly, uplink transmissions in wireless networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband CDMA (W-CDMA) systems, time division multiple access (TDMA) systems, frequency division multiple access (FDMA) systems, orthogonal frequency division multiple access (OFDMA) systems, wide band single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

When an application running on a user equipment (UE) has delay-sensitive information (e.g., control and data information) for transmitting to an eNB, the UE has to wait for a uplink subframe to transmit the information. This delay may affect performance of the application, UE, and/or the network. Therefore, there is a desire for a method and an apparatus for transmitting data on the uplink without any delay.

SUMMARY OF THE INVENTION

Various aspects may include methods and communications devices for implementing those methods of receiving an uplink (UL) short burst at an eNB, including determining, at the eNB, one or more tone assignments for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH), transmitting the one or more tone assignments to the UE, and receiving the UL short burst from the UE, wherein the UL short burst is generated at the UE based at least on the one or more tone assignments transmitted from the eNB.

Various aspects may include methods and communications devices for implementing those methods for transmitting a uplink (UL) short burst from a user equipment (UE), including: receiving, at the UE, one or more tone assignments from an eNB for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH), generating the UL short burst based at least on the one or more tone assignments received from the eNB, and transmitting the UL short burst to the eNB.

In some aspects, the one or more tone assignments may be received from the eNB via a physical downlink control channel (PDCCH).

In some aspects, the UL short burst may be transmitted to the eNB in a downlink (DL) centric subframe or a uplink (UL) centric subframe.

In some aspects, the UL short burst may be transmitted using one full symbol, two full symbols, or two split half-symbols.

In some aspects, the UL short burst is transmitted using one full symbol, and further may include: distributing the SRS across a full system bandwidth or half of the full system bandwidth. In such aspects, the SRS may be a comb based SRS when the SRS is distributed across the full system bandwidth. In other such aspects, the DMRS may be distributed with different densities in the PUCCH and the PUSCH.

In some aspects, the UL short burst may be transmitted using one full symbol, and may include: performing a frequency division multiplexing (FDM) of one or more of the SRS, the DMRS, the PUCCH, and the PUSCH for transmission to the eNB.

In some aspects, the UL short burst may be transmitted using two split half-symbols, and may include: performing a time division multiplexing (FDM) of the DMRS with the PUCCH or the PUSCH, and performing a frequency division multiplexing (FDM) of the SRS with an output of the TDM. Such aspects may also include determining that out of band emissions are generated over a threshold, and dropping SRS from the UL short burst based on determining that the out of band emissions generated are over the threshold. Various aspects may further include systems, communications devices having means for, and non-transitory processor-readable media having stored thereon, processor-executable instructions for carrying out and implementing the above described methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

An UL short burst may be defined in every subframe, both downlink centric and uplink centric subframes. This allows the UE to transmit delay sensitive information, either control data or user data, without waiting for an UL subframe. The UL short burst may be defined to include one or more of a sounding reference signal (SRS), a demodulation reference signal (DMRS), a physical uplink control channel (PUCCH), and/or a physical uplink shared channel (PUSCH).

The present disclosure provides an example method and an apparatus for receiving a uplink short burst at an eNB and/or transmitting an uplink short burst from a user equipment. The example method includes determining, at the eNB, one or more tone assignments for one or more channels of the UL short burst, wherein the one or more channels of the UL short burst include a SRS, a DMRS, a PUCCH, or a PUSCH; transmitting the one or more tone assignments to the UE; and receiving the UL short burst from the UE, wherein the UL short burst is generated at the UE based at least on the one or more tone assignments transmitted from the eNB.

The present disclosure provides an additional example method for transmitting a uplink (UL) short burst from a user equipment (UE) that may include receiving, at the UE, one or more tone assignments from an eNB for one or more channels of the UL short burst, wherein the one or more channels of the UL short burst include a SRS, a DMRS, a PUCCH, or a PUSCH; generating the UL short burst based at least on the one or more tone assignments received from the eNB; and transmitting the UL short burst to the eNB.

Figure 1:
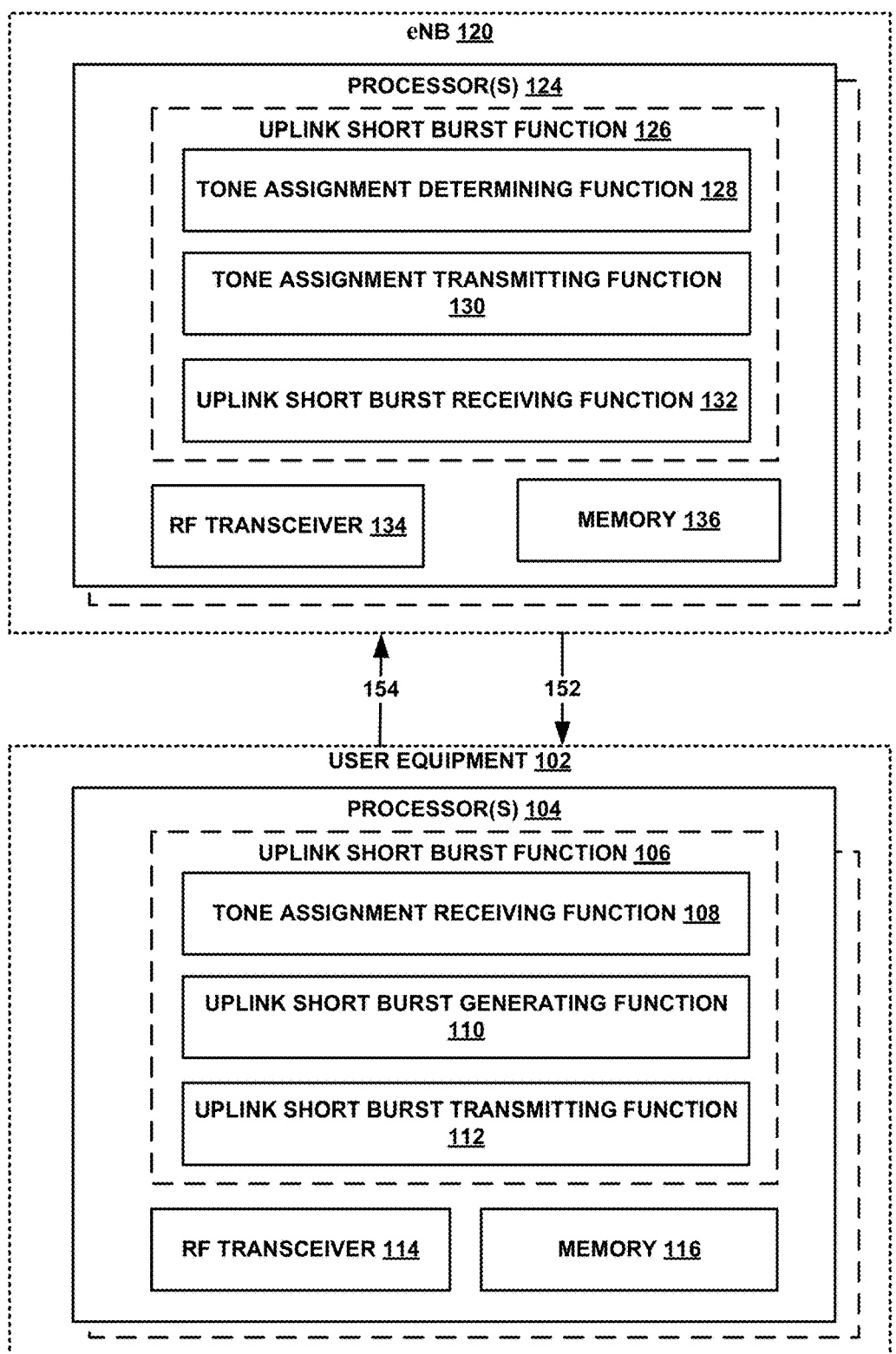
FIG. 1 is an example schematic diagram of a wireless communications system including a user equipment having an aspect of a uplink short burst function and an eNB having an aspect of the uplink short burst function in a wireless network.

Referring to FIG. 1, in an aspect, a wireless communication system 100 includes an user equipment (UE) 102 in communication with eNB 120. The eNB 120 includes one or more processors 124, and/or a uplink short burst function 126 running on the processor 124 (or processors 124 in a distributed computing environment) for receiving the uplink short burst from a UE 102 in a wireless network. In an aspect, eNB 120 and/or the uplink short burst function 126 may include a tone assignment determining function 128, a tone assignment transmitting function 130, and/or a uplink short burst receiving function 132. The eNB 120 may further include a radio frequency (RF) transceiver 134 and/or a memory 136 for receiving the uplink short burst from the UE 102.

UE 102 includes one or more processors 104, and/or a uplink short burst function 106 running on the processor 104 (or processors 104 in a distributed computing environment) for transmitting a uplink short burst to an eNB 120 in the wireless network. In an aspect, UE 102 and/or uplink short burst function 106 may include a tone assignment receiving function 108, a uplink short burst generating function 110, and/or a uplink short burst transmitting function 112. The UE 102 may further include a RF transceiver 114 and/or a memory 118 for transmitting the uplink short burst to the eNB 120.

UE 102 may communicate with one or more eNBs. The UE 102 may communicate with the eNB 120 via one or more over-the-air links, e.g., downlink (DL) 152 and/or uplink (UL) 154. In an aspect, the DL 152 is generally used for communication from eNB 120 to the UE 102 and/or the UL 154 is generally used for communication from the UE 102 to the eNB 120.

In an aspect, eNB 120 may be a base station (BS) or Node B or eNodeB, a macro cell, a small cell (e.g., a femtocell, or a pico cell), a relay, a peer-to-peer device, etc. In an example aspect, the nodes may operate according to wireless local area network (WLAN) specification as defined in IEEE 802.11 and/or may operate according to Wideband Code Division Multiple Access (W-CDMA), Code Division Multiple Access (CDMA), Time Division Synchronous Code Division Multiple Access (TD-SCDMA), Long Term Evolution (LTE), Global System for Mobile Communications (GSM), 5G (NR) standard as defined in 3GPP Specifications. In additional aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Figure 2A:
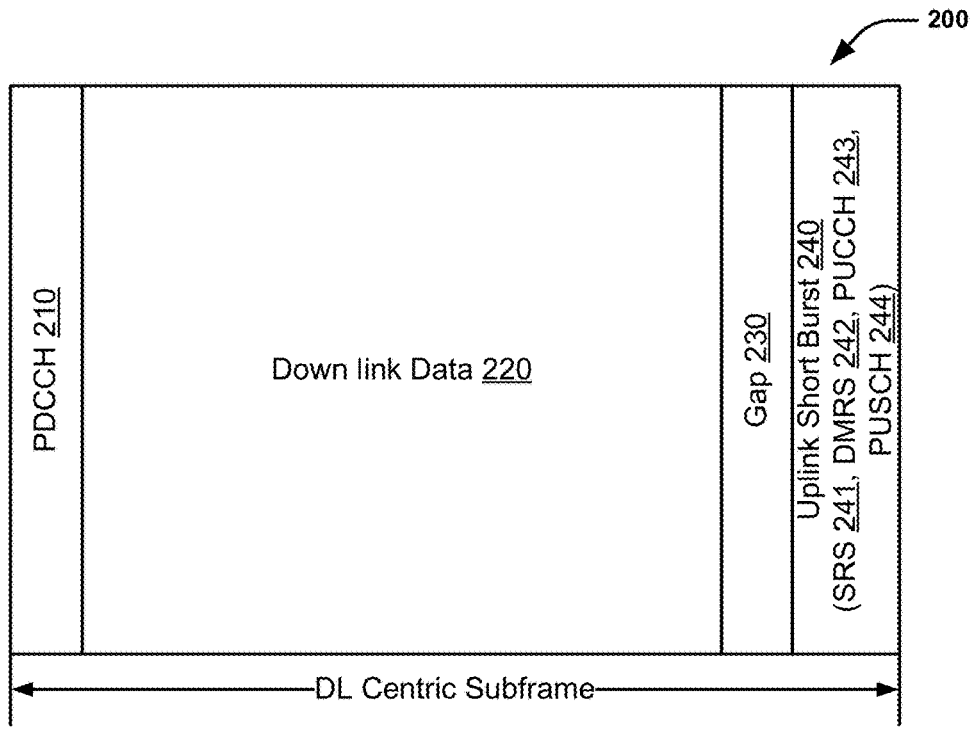
FIG. 2A illustrates an example downlink centric subframe in an aspect of the present disclosure.

FIG. 2A illustrates an example downlink centric subframe 200 in an aspect of the present disclosure.

In an aspect, for example, a DL centric subframe 200 may include a physical downlink control channel (PDCCH) 210, downlink data 220, a gap 230, and/or a uplink (UL) short burst 240. The PDCCH 210 may carry scheduling assignments and/or other control information, for example, downlink control information (DCI). The downlink data 220 may include user data transmitted from eNB 120 to UE 102. The gap 230 separates the downlink communication from the uplink communications. The uplink short burst 240 may include a sounding reference signal (SRS) 241, a demodulation reference signal (DMRS) 242, a physical uplink control channel (PUCCH) 243, and/or a physical uplink shared channel (PUSCH) 244.

The eNB 120 generally allocates a sub-set of tones/frequencies (at a specific time) from the resources that are available from the full system bandwidth for a specific UE (e.g., UE 102). The eNB 120, therefore, may try to determine which portions (e.g., symbols, tones, etc.) of a symbol have better channel quality, and may allocates the tones accordingly. The SRS 241, transmitted by the UE 102 to the eNB 120, is a reference signal for eNB 120 to enable the eNB 120 determine the channel quality of uplink 154. The DMRS 242 is used for channel estimation and for demodulation of the PUCCH 243 and the PUSCHH 244. The PUCCH 243 carries uplink control information (UCI) which is similar to DCI carried by the PDCCH 210. The PUSCH 244 carries both control information and user data. The control information, for example, may be multiple input multiple output (MIMO) related parameters and/or transport format indicators.

In an aspect, UE 102 may multiplex the various channels, e.g., SRS 241, DMRS 242, PUCCH 243, and/or PUSCH 244, of the uplink short burst 240 and may transmit the UL short burst 420 from the UE 102 to the eNB 120 in the DL centric subframe 200. Although the UL short burst 240 is shown to include the SRS, DMRS, PUCCH, and/or the PUSCH, not all of them have to be included in the UL short burst.

Figure 2B:
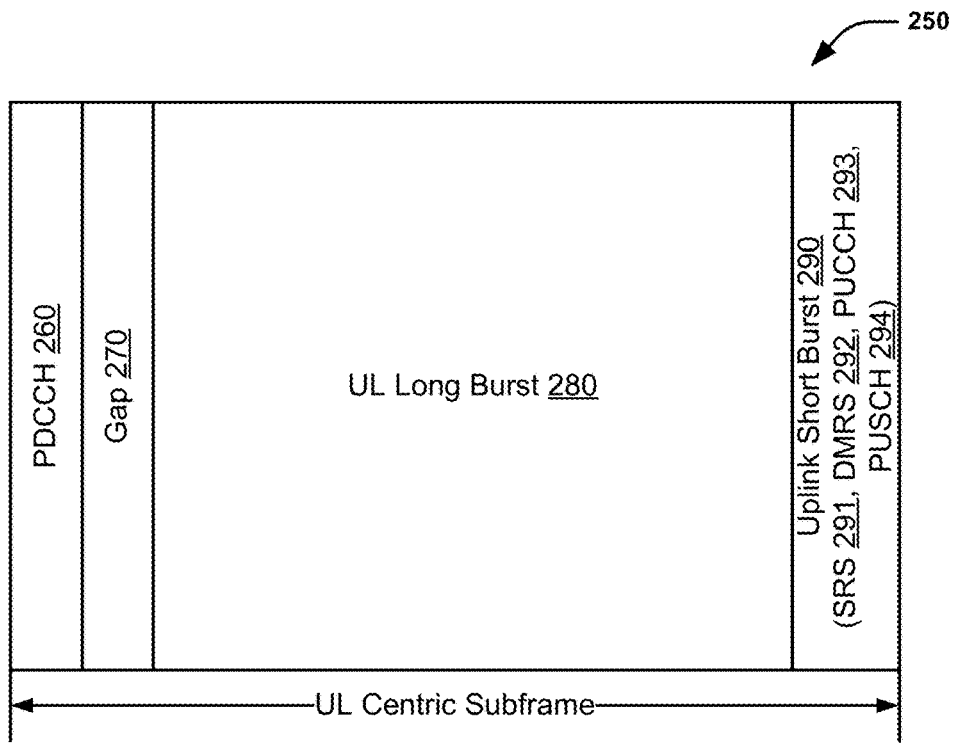
FIG. 2B illustrates an example uplink centric subframe in an aspect of the present disclosure.

FIG. 2B illustrates an example uplink centric subframe 250 in an aspect of the present disclosure.

In an aspect, for example, an UL centric subframe 250 may include a PDCCH 260, a gap 270, an UL long burst 280, and/or a uplink short burst 290.

The PDCCH 260 may be similar to PDCCH 210 of FIG. 2A and the gap 270 may be similar to the gap 230 of FIG. 2A. The UL long burst 280 may carry UL control information and user data. The uplink short burst 290 may be similar to the uplink short burst 240 of FIG. 2A (except that the uplink short burst 290 is transmitted in a uplink centric subframe 250 vs. the uplink short burst 240 which may be transmitted in a downlink centric subframe 200) and may include SRS 291 (similar to the SRS 241 of FIG. 2A), DMRS 292 (similar to the DMRS 242 of FIG. 2A), PUCCH 293 (similar to the PUCCH 243 of FIG. 2A), and/or a PUSCH 294 (similar to the PUSCH 244 of FIG. 2A).

Figures 3A, 3B:
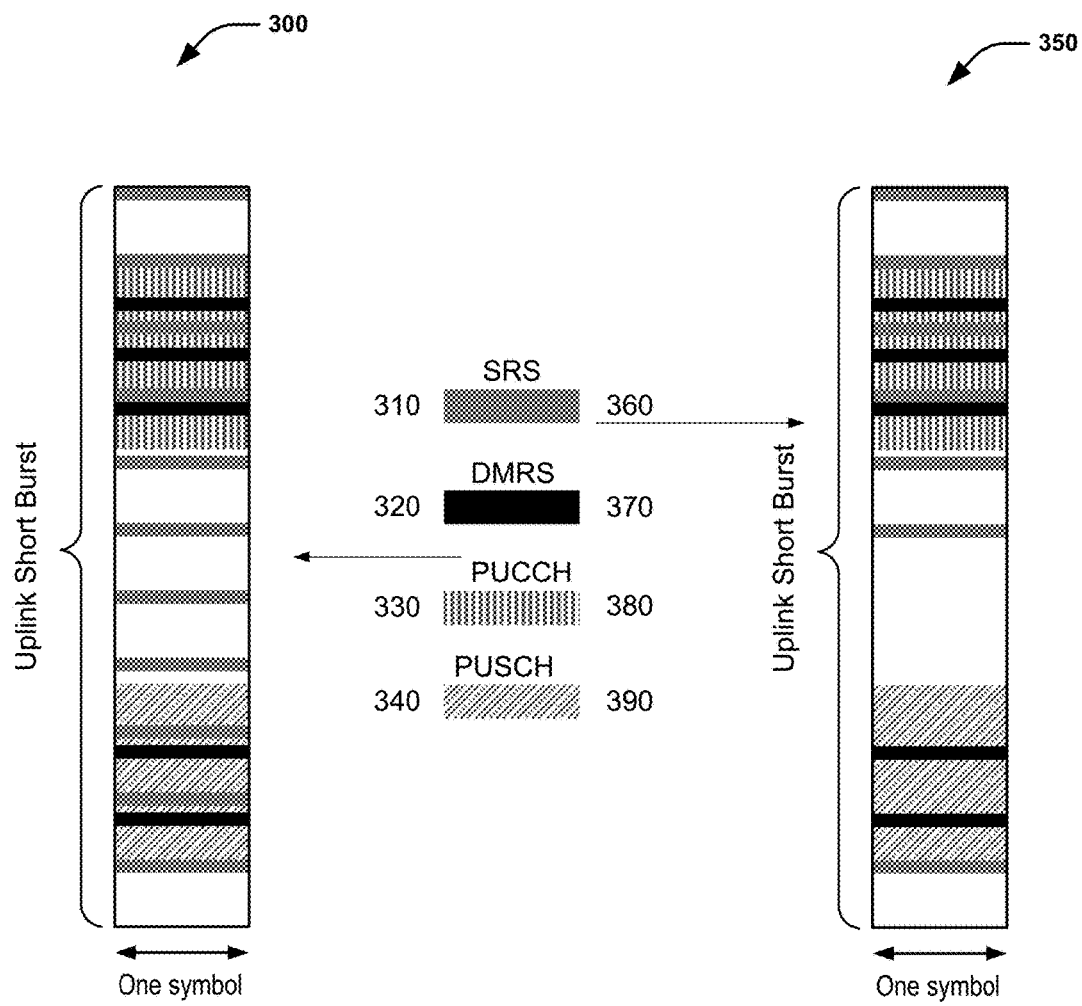
FIG. 3A illustrates an example UL short burst in an aspect of the present disclosure.
FIG. 3B illustrates an additional example UL short burst in an aspect of the present disclosure.

FIG. 3A illustrates an example UL short burst 300 in an aspect of the present disclosure.

The UL short burst 300 may include a SRS 310 (similar to SRSs 241 and 291 of FIGS. 2A and 2B, respectively), a DMRS 320 (similar to DMRSs 242 and 292 of FIGS. 2A and 2B, respectively), a PUCCH 330 (similar to PUCCHs 243 and 293 of FIGS. 2A and 2B, respectively), and/or a PUSCH 340 (similar to PUSCHs 244 and 294 of FIGS. 2A and 2B, respectively). In an aspect, the SRS 310, the DMRS 320, the PUCCH 330, and/or the PUSCH 340 may be multiplexed in the frequency domain, and transmitted from the UE 102 to the eNB 120 either in the DL centric subframe (e.g., DL centric subframe 200 of FIG. 2A) or the UP centric subframe (e.g., UL centric subframe 250 of FIG. 2B).

In one implementation, the SRS 310 of the UL short burst 300 may be a comb based SRS (e.g., a comb like structure) which is distributed across the bandwidth of the symbol. In an aspect, the SRS 310 may be a wideband SRS and distributed equally over the whole system bandwidth. In an additional or optional aspect, the SRS 310 may be distributed across a sub-band, e.g., one-half of the system bandwidth as described in detail below in reference to FIG. 3B. The DMRS 320 is associated with the PUCCH 330 and/or the PUSCH 340 and the DMRS 320 may transmitted only when the PUCCH 330 and/or the PUSCH 340 are transmitted.

The eNB 120 may assign different tones for the various component of the UL short burst 300. That is, the eNB 120 may assigned different tones for the four channels, e.g., SRS 310, DMRS 320, PUCCH 330, and/or PUSCH 340, of the UL short burst 300. In other words, unique set(s) of tones are assigned to the four channels of the UL short burst. The eNB may determine the assignment of tones and notify the tone assignment to the UE 102. For instance, as the UL short burst has only one assigned symbol in FIG. 3A, the eNB 120 determines channel conditions of the tones prior to assigning the tones to the SRS 310, the DMRS 320, the PUCCH 330, and/or the PUSCH 340. The eNB 120 may assign tones to the DMRS 320 if the eNB 120 assigns tones to the PUCCH 330 or the PUSCH 340 as the DMRS 320 is needed for decoding the PUCCH 330 and/or the PUSCH at the receiver, e.g., eNB 120.

Additionally, the density of DMRS 320 may be different for the PUCCH and the PUSCH. For example, in aspect, the eNodeB 120 may determine the number of tones to be assigned to PUCCH 330 and/or PUSCH 340, and may assign, for instance, 100 tones to the PUCCH 330 and 100 tones to the PUSCH 340 (different from the tones assigned to PUCCH 330). The eNodeB 120 may also determine, and assign, the number of tones (e.g., 3 tones) to the DMRS 320. For instance, the eNodeB 120 may assign 3 tones to the PUCCH and/or two tones to the PUSCH. The eNodeB 120 may signal the information about the assignment of tones to the UE via the PDCCH (e.g., PDCCH 210 of FIG. 2).

Further, for one UE 102, eNodeB 120 may assign contiguous (e.g., continuous) tones to PUCCH 330 and PUSCH 340 of the UE 102 to reduce the out of band emission at UE 102 for transmitting UL short burst. However, the contiguous tones assignment for PUCCH 330 and PUSCH 340 may not be available because part of the contiguous tones are taken over by PUCCH or PUSCH of other UEs.

FIG. 3B illustrates an additional example UL short burst 350 in an aspect of the present disclosure.

The UL short burst 350 includes a SRS 360 (similar to SRSs 241 and 291 of FIGS. 2A and 2B), a DMRS 370 (similar to DMRSs 242 and 292 of FIGS. 2A and 2B), a PUCCH 380 (similar to PUCCHs 243 and 293 of FIGS. 2A and 2B), and/or a PUSCH 390 (similar to PUSCHs 244 and 294 of FIGS. 2A and 2B). In an aspect, the SRS 360, the DMRS 370, the PUCCH 380, and/or the PUSCH 390 are multiplexed in the frequency domain and transmitted from the UE 102 to the eNB 120 either in the DL centric subframe 200 or the UL centric subframe 250.

The SRS 360 of the UL short burst 350 may be a comb based SRS (e.g., a comb like structure) which is distributed across a sub-band, for example, distributed in half of the system bandwidth (e.g., top half). In other words, the SRS 360 may be equally distributed in half the bandwidth, e.g., top half of the bandwidth as shown in FIG. 3B. The DMRS 370 is associated with the PUCCH 380 and/or the PUSCH 390 and may transmitted only when PUCCH 380 and/or PUSCH 390 are transmitted.

The eNB 120 may assign different tones for the various component of the UL short burst 350. That is, the eNB 120 may assigned different tones for the four channels, e.g., SRS 360, DMRS 370, PUCCH 380, and/or PUSCH 390, of the UL short burst 350. In other words, unique set(s) of tones are assigned to the four channels of the UL short burst. The eNB may determine the assignment of tones and notify the tone assignment to the UE 102. For instance, as the UL short burst has only one assigned symbol in FIG. 3B, the eNB 120 may determine channel conditions of the tones prior to assigning the tones to the SRS 360, the DMRS 370, the PUCCH 380, and/or the PUSCH 390. The eNB 120 may assign tones to the DMRS 370 if the eNB 120 assigns tones to the PUCCH 380 or the PUSCH 390 as the DMRS 370 is needed for decoding the PUCCH 380 and/or the PUSCH 390 at the receiver, e.g., eNB 120.

Additionally, the density of the DMRS 370 may be different (or same) for the PUCCH 380 and the PUSCH 390. For example, in aspect, the eNB 120 may assign, for instance, 100 tones to the PUCCH 380 and 100 tones to the PUSCH 390. The eNB 120 may also determine and assign 3 DMRS tones to the 100 tones assigned to the PUCCH 380 and/or assign two DMRS tones to the 100 tones assigned to the PUSCH 390. In an aspect, the eNB 120 may signal the information about the assignment of tones to the UE 102 via the PDCCH (e.g., PDCCH 210 of FIG. 2A or PDCCH 260 of FIG. 2B) or via radio resource control (RRC) messages.

Further, eNB 120 may assign contiguous (e.g., continuous) tones to the UE 102 based on the determination of the RF conditions by the eNodeB 120. However, the tones assigned to the PUCCH 380 and/or the PUSCH 390 may be taken over by the SRS 360 and/or the DMRS 370 as shown in FIG. 3B.

Figure 4:
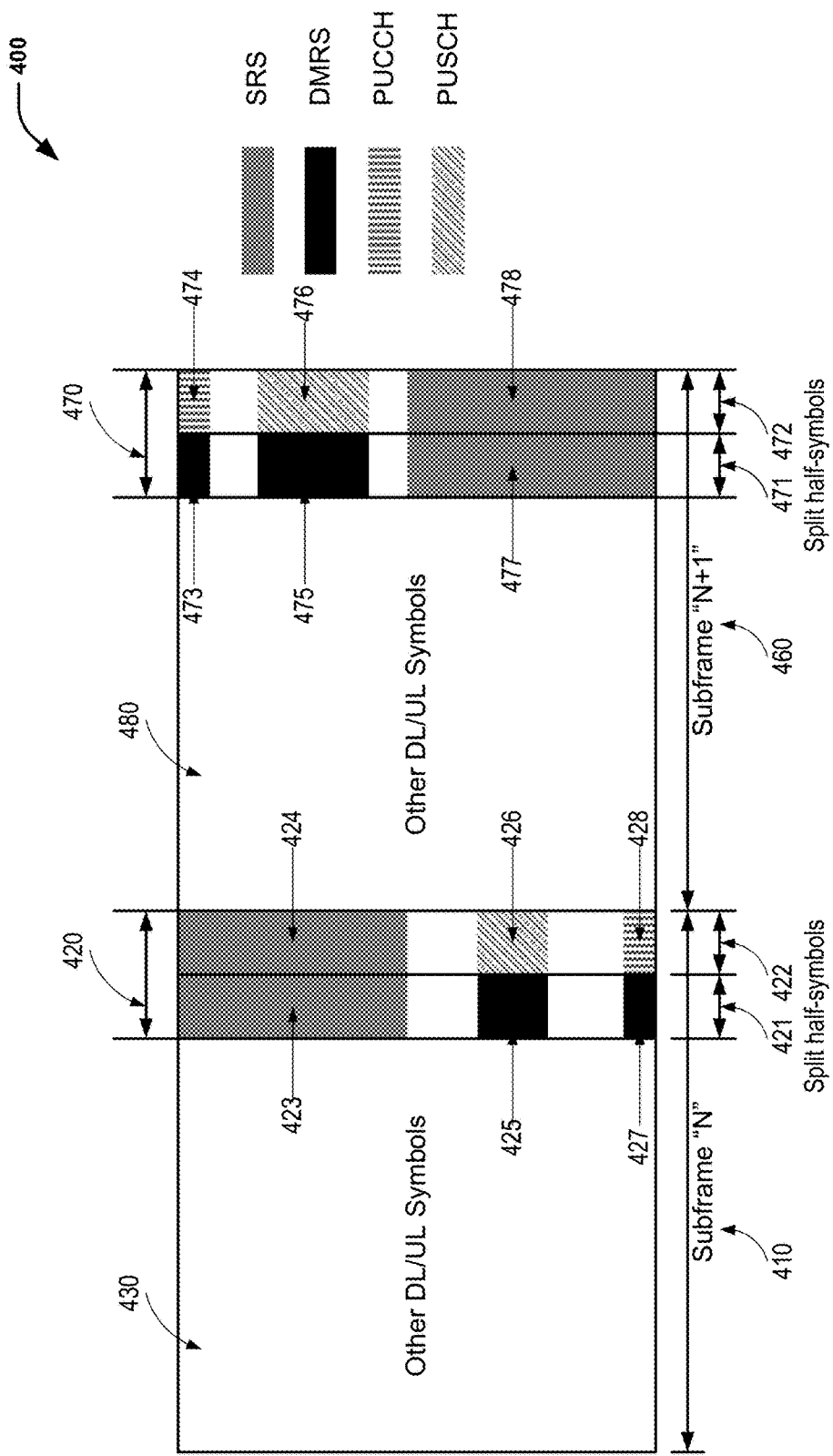
FIG. 4 illustrates an example UL short burst using multiple split-half symbols in aspects of the present disclosure.

FIG. 4 illustrates an example UL short burst 400 using multiple split-half symbols in aspects of the present disclosure.

The UL short bursts 420 and 470 may be transmitted in subframes "N" 410 and "N+1" 420. The UL short burst 420 transmitted in the subframe N 410 may include two split half-symbols 421 and 422. A split half-symbol may be generated by splitting a symbol (e.g., an OFDM symbol) into two in the time domain (x-axis). That is, a split half-symbol includes the tones or frequencies of a full OFDM symbol for half the duration of the full OFDM symbol. The other DL/UL symbols 430 of the subframe 410 may be used for transmission of a PDCCH and/or downlink data in a downlink centric subframe or a PDCCH and/or a uplink long burst in a uplink centric subframe.

As illustrated in FIG. 4, in subframe N 410, the UL short burst 420 includes a SRS 423 being transmitted in a top half of the system bandwidth of the split half-symbol 421 and a SRS 424 being transmitted in a top half of the system bandwidth of the split half-symbol 422. DMRS 425 and 427 are transmitted in the lower half of the system bandwidth of the split half-symbol 421. PUSCH 426 and PUCCH 428 are transmitted in the lower half of the system bandwidth of the split half-symbol 422. DMRS 427 in the split half-symbol 421 is aligned with a PUCCH 428 in the split half-symbol 422, DMRS 425 in the split half-symbol 421 is aligned with a PUSCH 426 in the split half-symbol 422. That is, the DMRS 425/427 is aligned in frequency domain with the PUSCH 426 or the PUCCH 428. In other words, the DMRSs are assigned the same frequency tones as the PUCCH or the PUSCH. This allows for proper decoding of the PUCCH and/or the PUSCH at the receiver (e.g., at eNB 120).

Additionally, SRS, DMRS, PUCCH, and/or PUSCH may frequency hop to achieve diversity in the frequency domain to improve reliability and/or performance. For example, the frequencies used by the SRSs 423 and 424 in the subframe N 410 may be different from the tones/frequencies used by the SRSs 477 and 478 in subframe N+1 460. For instance, the SRSs 477 and 478 may use tones at the bottom of split half-symbols 471 and 472. Further, frequency hopping may be supported for the DMRS (hopping from the DMRS 425 and 427 in the subframe N 410 to DMRS 473 and 475 in the subframe N+1 460), the PUCCH (hopping from the PUCCH 428 in the subframe N 410 to the PUCCH 474 in subframe N+1 460), and/or the PUSCH (hopping from the PUSCH 426 in subframe N 410 to the PUSCH 476 in subframe N+1 460).

In one implementation, the DMRS may be aligned with the PUCCH or the PUSCH in the frequency domain so that the DMRS may be multiplexed with PUCCH or the PUSCH in the time domain. For instance, the DMRS may be assigned tones in the first split half-symbol and the PUCCH may be assigned the corresponding tones (e.g., same frequencies) in the second split half-symbol of the same subframe. Similarly, the DMRS may be assigned tones in the first split half-symbol and the PUSCH may be assigned the corresponding tones (e.g., same frequencies) in the second split half-symbol of the same subframe. For example, the DMRS 425 may be assigned tones 425 in the first split half-symbol 421 and the PUSCH 426 may be assigned the same tones (e.g., same frequencies) in the corresponding second split half-symbol 422. Similarly, the DMRS 427 is assigned tones 427 in first split half-symbol 421 and the PUCCH 428 may be assigned the tones with the same frequencies in the second split half-symbol 422 (e.g., same frequencies at a different time). In other words, the DMRS may be aligned in the frequency domain with the PUCCH or the PUSCH to enable proper decoding of the PUCCH/PUSCH at the receiver (e.g., eNB 120).

Although the subframes N 410 and N+1 420 are shown as being assigned to the same UE, the subframes N 410 and N+1 420 may be assigned to two different UEs. In another implementation, if the UE 102 has to transmit the PUCCH or the PUSCH, a single carrier waveform, e.g., DFT-S-OFRM, may be used. However, if the UE has to transmit both the PUCCH and the PUSCH, a single carrier waveform may not feasible.

The tone assignments for a UE may be determined, e.g., dynamically, based on the channel conditions of the symbols and signaled to the UE via the PDCCH. Alternately, the tone assignments may be signed via semi-static radio resource control (RRC) messages and may follow pre-defined frequency hopping patterns over different subframes.

In one implementation, when simultaneous SRS, DMRS, PUCCH, and/or PUSCH channels are available for transmission from the same UE (e.g., UE 102), the eNB 120 may schedule the channels on contiguous (e.g., continuous) tones when contiguous tones are available. However, contiguous tones may not be always available as some of the tones may have been already assigned to other UEs. In such a scenario, non-contiguous tones may be assigned which may result in excessive (e.g., over a threshold) out-of-band emission. The UE 102 may drop SRS from the UL short burst and transmit the UL short burst without the SRS.

In another implementation, when split half-symbols are used for transmitting the UL short burst, the tones assigned to the PUCCH and the PUSCH tones are not taken away by SRS and DMRS as described in reference to FIG. 3.

Figure 5:
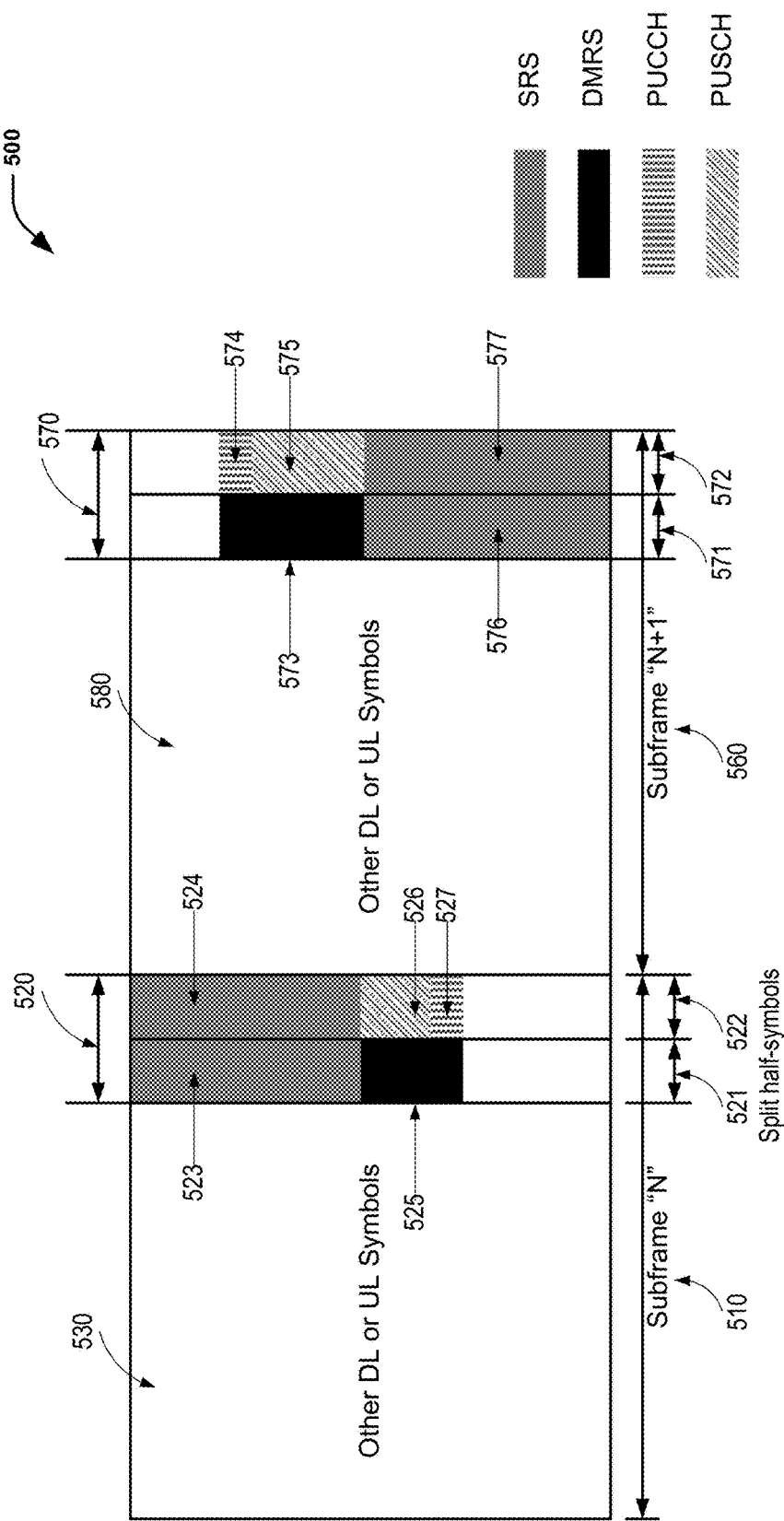
FIG. 5 illustrates an additional example of a UL short burst using multiple split symbols in aspects of the present disclosure.

FIG. 5 illustrates an additional example of a UL short burst 500 using multiple split symbols in aspects of the present disclosure.

For example, UL short bursts 520 and 570 may be transmitted in subframes "N" 510 and "N+1" 520. The UL short bursts 520 and 570 may be transmitted using split-half symbols 521 and 522 in subframe N 510 and split half-symbols 571 and 572 in subframe N+1 560.

In one implementation, the UL short burst 520 may be transmitted during subframe N 510 and may include SRSs 523 (using a split half-symbol 521) and 524 (using split half-symbol 522), a DMRS 525 (using a split half-symbol 531), a PUCCH 527 (using split half-symbol 532), and/or a PUSCH 526 (using a split half-symbol 532). The UL short burst 570 may be transmitted during subframe N+1 560 and may include SRSs 576 (using a split half-symbol 571) and 577 (using split half-symbol 572), a DMRS 573 (using a split half-symbol 571), a PUCCH 574 (using split half-symbol 522), and/or a PUSCH 575 (using a split half-symbol 522).

Figure 6:
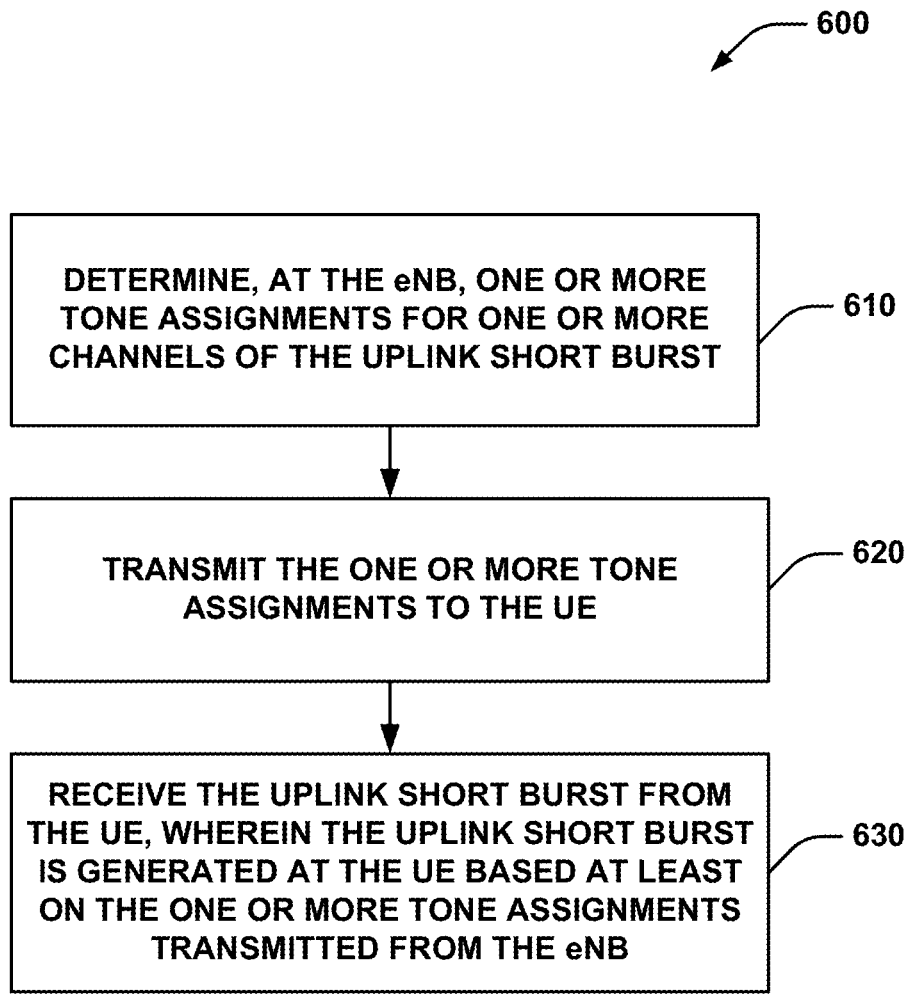
FIG. 6 illustrates an example methodology for receiving a uplink short burst in an aspect of the present disclosure.

FIG. 6 illustrates an example methodology 600 for receiving a uplink short burst in an aspect of the present disclosure.

In an aspect, at block 610, methodology 600 may include determining, at the eNB, one or more tone assignments for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH). For example, in an aspect, eNB 120 and/or uplink short burst function 126 may include a tone assignment determining function 128 such as a specially programmed processor module, or a processor executing specially programmed code stored in a memory, to determine, at the eNB 120, one or more tone assignments for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH). In one implementation, eNB 120, uplink short burst function 126, and/or tone assignment determining function 128 may determine the tones to be assigned to the various channels of the UL short burst based on the channel conditions of the various tones.

In an aspect, at block 620, methodology 600 may include transmitting the one or more tone assignments to the UE. For example, in an aspect, eNB 120 and/or uplink short burst function 126 may include a tone assignment transmitting function 130 such as a specially programmed processor module, or a processor executing specially programmed code stored in a memory, to transmit the one or more tone assignments to the UE. The tone assignments may be transmitted in a PDCCH.

In an aspect, at block 630, methodology 600 may include receiving the UL short burst from the UE, wherein the UL short burst is generated at the UE based at least on the one or more tone assignments transmitted from the eNB. For example, in an aspect, eNB 120 and/or uplink short burst function 126 may include a uplink short burst receiving function 132 such as a specially programmed processor module, or a processor executing specially programmed code stored in a memory, to receive the UL short burst from the UE, wherein the UL short burst is generated at the UE based at least on the one or more tone assignments transmitted from the eNB.

Figure 7:
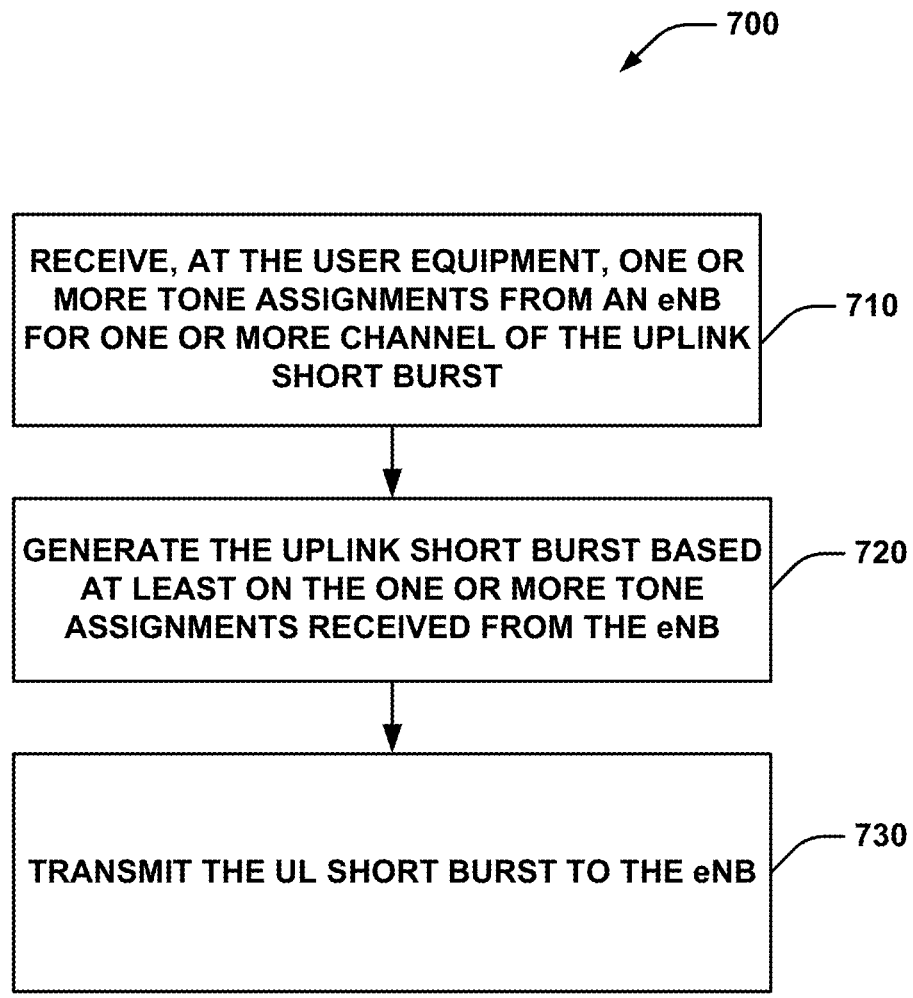
FIG. 7 illustrates an example methodology for transmitting a uplink short burst in an aspect of the present disclosure.

In one implementation, the UL short burst may be received in a downlink centric subframe or a uplink centric subframe. In another implementation, the UL short burst may be received from the UE via one full symbol, two full symbols, or two split half-symbols FIG. 7 illustrates an example methodology 700 for transmitting a uplink short burst in an aspect of the present disclosure.

In an aspect, at block 710, methodology 700 may include receiving, at the UE, one or more tone assignments from an eNB for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH). For example, in an aspect, UE 102 and/or uplink short burst function 106 may include a tone assignment receiving function 108 such as a specially programmed processor module, or a processor executing specially programmed code stored in a memory, to receive, at UE 102, one or more tone assignments from an eNB 120 for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH).

In an aspect, at block 720, methodology 700 may include generating the UL short burst based at least on the one or more tone assignments received from the eNB. For example, in an aspect, UE 102 and/or uplink short burst function 106 may include a uplink short burst generating function 110 such as a specially programmed processor module, or a processor executing specially programmed code stored in a memory, to generate the UL short burst based at least on the one or more tone assignments received from the eNB; and transmit the one or more tone assignments to the UE. For example, UE 102, uplink short burst function 106, and/or uplink short burst generating function 110 may generate the UL short bursts as shown, for example, in FIGS. 2-5.

In an aspect, at block 730, methodology 700 may include transmitting the UL short burst to the eNB. For example, in an aspect, UE 102 and/or uplink short burst function 106 may include a uplink short burst transmitting function 112 such as a specially programmed processor module, or a processor executing specially programmed code stored in a memory, to transmit the UL short burst to the eNB. In one implementation, the UL short burst may be transmitted via a PDDCH in an downlink centric subframe or a uplink centric subframe using one full symbol, two full symbol, or two split-half symbols.

Various aspects may include methods and communications devices for implementing those methods of receiving an uplink (UL) short burst at an eNB, including determining, at the eNB, one or more tone assignments for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH), transmitting the one or more tone assignments to the UE, and receiving the UL short burst from the UE, wherein the UL short burst is generated at the UE based at least on the one or more tone assignments transmitted from the eNB.

In some aspects, the one or more tone assignments may be sent from the eNB via a physical downlink control channel (PDCCH).

In some aspects, the UL short burst may be received from the UE in a downlink (DL) centric subframe or a uplink (UL) centric subframe.

In some aspects, the UL short burst may be received from the UE via one full symbol, two full symbols, or two split half-symbols.

Various aspects may include methods and communications devices for implementing those methods for transmitting a uplink (UL) short burst from a user equipment (UE), including: receiving, at the UE, one or more tone assignments from an eNB for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH), generating the UL short burst based at least on the one or more tone assignments received from the eNB, and transmitting the UL short burst to the eNB.

In some aspects, the one or more tone assignments may be received from the eNB via a physical downlink control channel (PDCCH).

In some aspects, the UL short burst may be transmitted to the eNB in a downlink (DL) centric subframe or a uplink (UL) centric subframe.

In some aspects, the UL short burst may be transmitted using one full symbol, two full symbols, or two split half-symbols.

In some aspects, the UL short burst is transmitted using one full symbol, and further may include: distributing the SRS across a full system bandwidth or half of the full system bandwidth. In such aspects, the SRS may be a comb based SRS when the SRS is distributed across the full system bandwidth. In other such aspects, the DMRS may be distributed with different densities in the PUCCH and the PUSCH.

In some aspects, the UL short burst may be transmitted using one full symbol, and may include: performing a frequency division multiplexing (FDM) of one or more of the SRS, the DMRS, the PUCCH, and the PUSCH for transmission to the eNB.

In some aspects, the UL short burst may be transmitted using two split half-symbols, and may include: performing a time division multiplexing (FDM) of the DMRS with the PUCCH or the PUSCH, and performing a frequency division multiplexing (FDM) of the SRS with an output of the TDM. Such aspects may also include determining that out of band emissions are generated over a threshold, and dropping SRS from the UL short burst based on determining that the out of band emissions generated are over the threshold. As used in this application, the terms "function," "process," "system" and the like are intended to include a computer-related entity, such as but not limited to hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device can be a process. One or more modules can reside within a module and/or thread of execution and a module may be localized on one computer and/or distributed between two or more computers. In addition, these modules can execute from various computer readable media having various data structures stored thereon. The processes may communicate by way of local and/or remote modules such as in accordance with a signal having one or more data packets, such as data from one module interacting with another module in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Several aspects of improved measurement event reporting message associated with a tune away have been presented with reference to a W-CDMA system. As those skilled in the art will readily appreciate, various aspects described throughout this disclosure may be extended to other telecommunication systems, network architectures and communication standards.

By way of example, various aspects described herein related to RACH preamble transmission may be extended to other UMTS and/or LTE and/or other systems where UE has bursty data to transmit which is not suitable for establishing a dedicated channel (e.g., during a forward access channel (CELL_FACH) state)). For example, such UMTS systems may include TD-SCDMA, High Speed Downlink Packet Access (HSDPA), High Speed Uplink Packet Access (HSUPA), High Speed Packet Access Plus (HSPA+) and TD-CDMA. Also, such LTE and/or other systems may include Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method of receiving a uplink (UL) short burst at an eNB, comprising:
   determining, at the eNB, one or more tone assignments for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH);
   transmitting the one or more tone assignments to the UE; and
   receiving the UL short burst from the UE, wherein the UL short burst is generated at the UE based at least on the one or more tone assignments transmitted from the eNB.

2. The method of claim 1, wherein the one or more tone assignments are sent from the eNB via a physical downlink control channel (PDCCH).

3. The method of claim 1, wherein the UL short burst is received from the UE in a downlink (DL) centric subframe or a uplink (UL) centric subframe.

4. The method of claim 1, wherein the UL short burst is received from the UE via one full symbol, two full symbols, or two split half-symbols.

5. A method of transmitting a uplink (UL) short burst from a user equipment (UE), comprising:
   receiving, at the UE, one or more tone assignments from an eNB for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH);
   generating the UL short burst based at least on the one or more tone assignments received from the eNB; and
   transmitting the UL short burst to the eNB.

6. The method of claim 5, wherein the one or more tone assignments are received from the eNB via a physical downlink control channel (PDCCH).

7. The method of claim 5, wherein the UL short burst is transmitted to the eNB in a downlink (DL) centric subframe or a uplink (UL) centric subframe.

8. The method of claim 5, wherein the UL short burst is transmitted using one full symbol, two full symbols, or two split half-symbols.

9. The method of claim 8, wherein the UL short burst is transmitted using one full symbol, and further comprising:
   performing a frequency division multiplexing (FDM) of one or more of the SRS, the DMRS, the PUCCH, and the PUSCH for transmission to the eNB.

10. The method of claim 8, wherein the UL short burst is transmitted using two split half-symbols, and further comprising:
    performing a time division multiplexing (FDM) of the DMRS with the PUCCH or the PUSCH; and
    performing a frequency division multiplexing (FDM) of the SRS with an output of the TDM.

11. The method of claim 10, further comprising:
    determining that out of band emissions are generated over a threshold; and
    dropping SRS from the UL short burst based on determining that the out of band emissions generated are over the threshold.

12. The method of claim 5, wherein the UL short burst is transmitted using one full symbol, and further comprising:
    distributing the SRS across a full system bandwidth or half of the full system bandwidth.

13. The method of claim 12, wherein the SRS is a comb based SRS when the SRS is distributed across the full system bandwidth.

14. The method of claim 12, wherein the DMRS is distributed with different densities in the PUCCH and the PUSCH.

15. An eNB for receiving an uplink (UL) short burst, comprising:
    a transceiver;
    a memory; and
    one or more processors coupled to the transceiver and the memory, the one or more processors configured to:
       determine one or more tone assignments for one or more channels of the UL short burst, wherein the one or more channels of the UL short burst include a sounding reference signal (SRS), a demodulation reference signal (DMRS), a physical uplink control channel (PUCCH), or a physical uplink shared channel (PUSCH);
       transmit the one or more tone assignments to the UE; and
       receive the UL short burst from the UE, wherein the UL short burst is generated at the UE based at least on the one or more tone assignments transmitted from the eNB.

16. The eNB of claim 15, wherein the one or more tone assignments are sent from the eNB via a physical downlink control channel (PDCCH).

17. The eNB of claim 15, wherein the UL short burst is received from the UE in a downlink (DL) centric subframe or a uplink (UL) centric subframe.

18. The eNB of claim 15, wherein the UL short burst is received from the UE via one full symbol, two full symbols, or two split half-symbols.

19. The eNB of claim 15, wherein the UL short burst is transmitted using two split half-symbols, and further comprising:
   performing a time division multiplexing (FDM) of the DMRS with the PUCCH or the PUSCH; and
   performing a frequency division multiplexing (FDM) of the SRS with an output of the TDM.

20. The eNB of claim 19, wherein the one or more processors are further configured to:
   determine that out of band emissions are generated over a threshold; and
   drop SRS from the UL short burst based on determining that the out of band emissions generated are over the threshold.

\* \* \* \* \*